Patented Sept. 30, 1941

2,257,186

UNITED STATES PATENT OFFICE 2,257,186

PROCESS OF REMOVING METAL OXIDES AND PREPARATIONS SUITABLE IN THIS PROCESS

Ludwig Orthner, Frankfort-on-the-Main, and Willibald Ender, Ludwigshafen-on-the-Rhine, Germany, assignors, by mesne assignments, to General Aniline & Film Corporation, New York, N. Y., a corporation of Delaware No Drawing. Application February 9, 1938, Serial No. 189,707. In Germany February 13, 1937

9 Claims. (Cl. 252—152)

The present invention relates to a process of removing metal oxides and to preparations suitable in this process.

We have found that metal oxides, for instance, rust and oxides of silver, copper, cobalt, nickel and the like or their alloys, for instance brass, formed or deposited on materials of various kind may very easily be removed by treating the material with an agent containing one or more water-soluble amino-acids in which there are more than one organic radical carrying a carboxyl group for each basic nitrogen atom, or a salt or salts of these amino-acids; if desired, further ingredients may also be present.

Amino acids of the above kind are, for instance, nitrilo-triacetic acid, ethylene-bis-(imino-diacetic acid), anthranilic acid N-diacetic acid and other imino-diacetic acids in which the hydrogen atom of the imino group has been exchanged for an alkyl, aryl, aralkyl or hydroxy-alkyl group, amino acids which are obtained by the action of several mols of chloracetic acid upon 1 mol of hydroxylamine, hydrazine or a polyamine; furthermore C-phenyl-nitrilo-triacetic acid, C-dimethyl-nitrilo-triacetic acid, N-(1-carboxy-cyclohexyl)-imino-diacetic acid.

The above-named substances may be added to the usual polishing powders, polishing pastes or liquid polishes.

It is a further object of the present invention that rust may with certainty be removed by using an agent containing, besides the above-mentioned amino-carboxylic acids, furthermore one or more water-soluble substances having a reducing action and capable of transforming iron compounds from the ferric state into the ferrous state.

As water-soluble substances having a reducing action there may, for instance, be used sodium hyposulfite, sodium sulfide or grape sugar. The above-named agents may be used in a neutral, acid or alkaline bath. Their effect even in the absence of an acid is valuable in cases where it is not possible to remove the rust by means of agents having an acid action lest the material be damaged.

The rust may be removed by treating the rusty material, for instance rusted iron-ware or iron-mould stains on textile fabrics, with a hot aqueous alkaline solution of the sodium salt of one of the above-mentioned amino-acids to which there has been added a reducing agent capable of reducing ferric compounds to ferrous compounds. The ferrous sulfide which is perhaps temporarily formed when sodium hyposulfite is used as the reducing agent is redissolved with formation of complex iron compounds. Other additional substances, such as Glauber's salt, sodium carbonate, phosphates, emulsifiers for fats and oils and the like, may further be added to the above rust-removing agents.

In the manufacture of the rust-removing agents attention must be paid to the varying degree of solubility in water of the different amino-acids and reducing agents used. In the case of mixtures of 2 parts of the sodium salt of nitrilo-triacetic acid or of ethylene-bis-(imino-diacetic acid) and 1 part of sodium hyposulfite there may, for instance, be dissolved up to 40 parts by weight in 100 parts by weight of water. In general, the aqueous solutions used are preferably rendered feebly alkaline. It is also possible, however, to make up solid or pasty preparations containing the said ingredients, which may be employed as rust-removing agents if desired after the addition of water.

The following examples serve to illustrate the invention, but they are not intended to limit it thereto; the parts are by weight:

(1) 80 parts of kieselguhr are made into a paste with a solution of 2 parts of dextrin, 2 parts of the sodium salt of tri-glycolamide acid (nitrilo-tri-acetic acid) in 20 parts of water; the whole is filled into moulds and dried. This preparation is suitable for cleaning metallic surfaces, for instance, materials containing copper.

(2) 12 parts of curd soap, 25 parts of tripoli, 30 parts of kieselguhr and 6 parts of polishing rouge are worked up into a polishing soap together with 22 parts of water, wherein 2 parts of the sodium salt of ethylene-diamino-tetra-acetic acid are dissolved.

(3) Into a solution of 3 parts of ammonium oleate in 97 parts of soft water, 1.5 parts of the sodium salt of nitrilo-triacetic acid are introduced and 3 parts of an incombustible solvent for fats are added by emulsification. A good liquid metal polish is thus obtained.

(4) A very effective metal polish is obtained by mixing the following ingredients:

| | Parts |
|---|---|
| Crystal oil (white oil), a benzine fraction | 5 |
| Alcohol | 5 |
| Disodium salt of nitrilo-acetic acid | 4 |
| Water | 20 |
| Bentonite | 2 |
| Water | 60 |
| Siliceous chalk (sintered silicic acid) | 40 |
| Eosin | 0.03 |
| Water | 5 |
| Ammonia of 25 per cent. strength | 2.5 |

Instead of the 4 parts of disodium salt of nitrilo-acetic acid contained in the above composition there may also be used 2 parts of that sodium salt in admixture with 2 parts of olein.

(5) A rusty tin-plate strip is treated at boiling temperature with an aqueous solution containing per liter 1 to 20 grams of sodium nitrilo-triacetate and 1 to 20 grams of sodium hyposulfite, the concentration of the solution varying according to the degree of rusting and the treatment being continued until the layer of dust has disappeared. The hyposulfite may also be added in several small portions, while boiling. The solution may contain, instead of the sodium nitrilo-triacetate, the sodium salt of ethylene-bis-(imino-diacetic acid) or of one of the above-named amino-acids.

(6) A cotton fabric stained with iron-mould is introduced into a solution containing sodium hyposulfite, ammonia and a water-soluble salt of one of the amino-acids named in Example 5, and the whole is then allowed to stand for several hours. After this treatment, the iron-moulds have completely disappeared. The disappearance may be accelerated by heating to gentle boiling.

(7) A rusty iron sheet is treated with a mixture containing sodium hyposulfite, sodium carbonate, quartz sand, oil and water and a sodium salt of an amino-acid mentioned in Example 5, by spreading the mixture, while vigorously rubbing or brushing, over the plate, causing it to react for some time and pursuing the mechanical treatment until the layer of rust is removed. The iron plate treated in this way is quickly and thoroughly freed from rust.

(8) A rusty iron plate is treated under the conditions described in Example 5, sodium hyposulfite being exchanged for the same amount of grape sugar. This treatment detaches the rust from the material.

We claim:

1. The process of removing metal oxides deposited on materials which comprises subjecting the materials to be cleaned to the action of a mixture of the sodium salt of a carboxylic acid having the general formula:

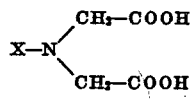

wherein X stands for a carboxylic acid radical selected from the group consisting of CH₂—COOH and

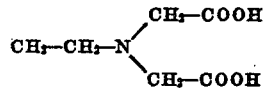

and sodium hyposulfite said mixture being in the form of an aqueous paste.

2. The process of removing rust deposited on materials which comprises subjecting the materials to be cleaned to the action of an aqueous solution of a mixture of the sodium salt of a carboxylic acid having the general formula:

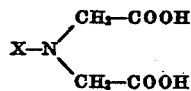

wherein X stands for a carboxylic acid radical selected from the group consisting of CH₂—COOH and

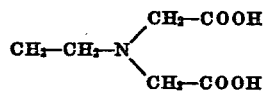

and sodium hyposulfite.

3. The process of removing metal oxides deposited on materials which comprises subjecting the materials to the action of an aqueous paste of a mixture of the sodium salt of nitrilo-triacetic acid and sodium hyposulfite.

4. The process of removing rust deposited on textile fabrics which comprises subjecting the fabrics to the action of a hot aqueous alkaline solution of a mixture of the sodium salt of nitrilo triacetic acid and sodium hyposulfite.

5. The process of removing metal oxides deposited on materials which comprises subjecting the materials to the action of an aqueous paste of a mixture of the sodium salt of ethylene-bis-(imino-diacetic acid) and sodium hyposulfite.

6. The process of removing rust deposited on textile fabrics which comprises subjecting the fabrics to the action of a hot aqueous alkaline solution of a mixture of the sodium salt of ethylene-bis-(imino-diacetic acid) and sodium hyposulfite.

7. A preparation suitable for removing metal oxides deposited on materials consisting of a mixture of sodium salt of a carboxylic acid having the general formula

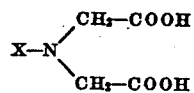

wherein X stands for a carboxylic acid radical selected from the group consisting of CH₂—COOH and

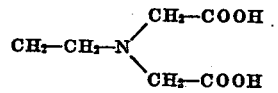

and sodium hyposulfite.

8. A preparation suitable for removing metal oxides deposited on materials consisting of a mixture of the sodium salt of nitrilotriacetic acid and sodium hyposulfite.

9. A preparation suitable for removing metal oxides deposited on materials consisting of a mixture of the sodium salt of ethylene-bis-(imino-diacetic acid) and sodium hyposulfite.

LUDWIG ORTHNER.
WILLIBALD ENDER.